Dec. 4, 1928.
H. NEUWIRTH
HYDROMETER
Filed June 30, 1926
1,694,138
2 Sheets-Sheet 1
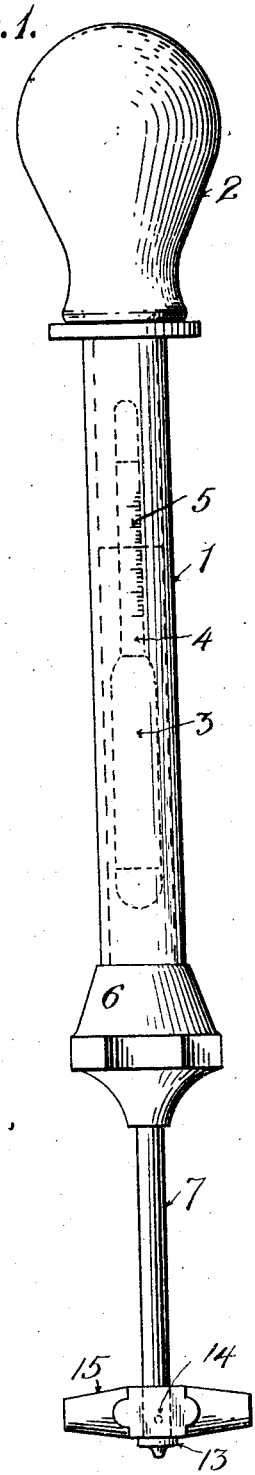
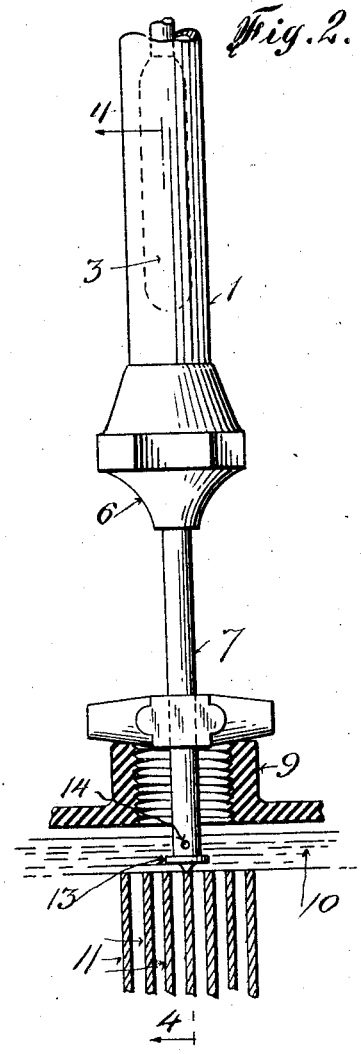
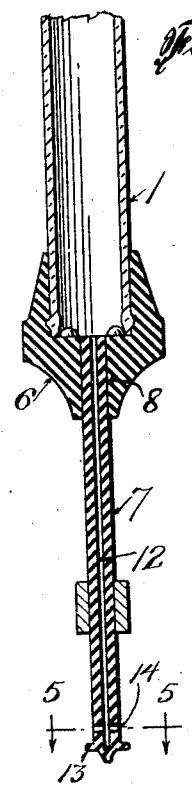
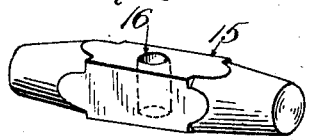
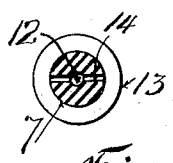
INVENTOR
Herman Neuwirth
BY
Charles G. Hensley
ATTORNEY Dec. 4, 1928.  
H. NEUWIRTH  
1,694,138  
HYDROMETER  
Filed June 30, 1926  
2 Sheets-Sheet 2
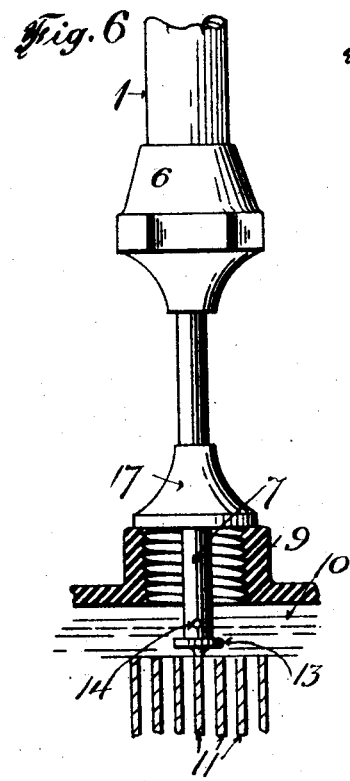
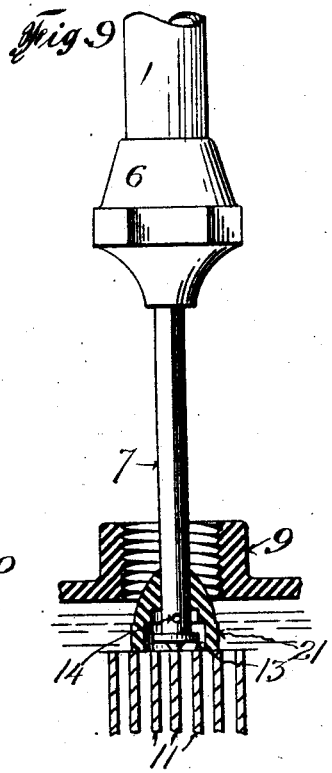
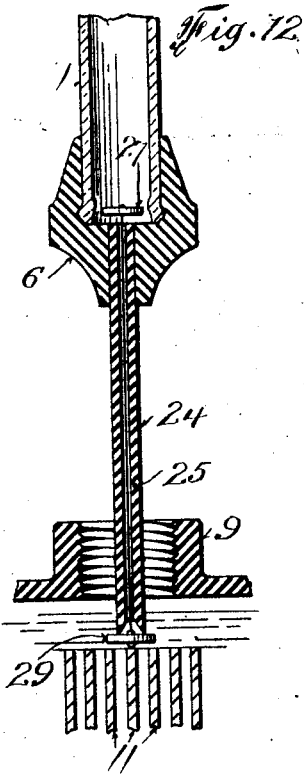
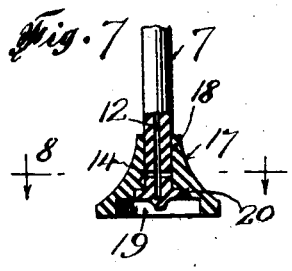
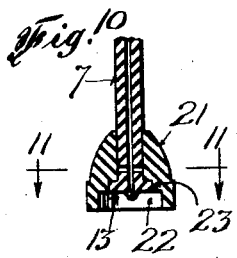
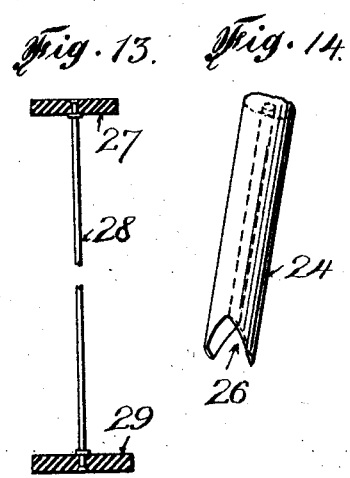
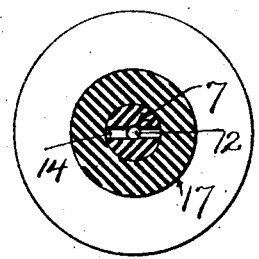

Patented Dec. 4, 1928.

1,694,138

UNITED STATES PATENT OFFICE.

HERMAN NEUWIRTH, OF BROOKLYN, NEW YORK, ASSIGNOR TO TESTRITE INSTRUMENT CO., OF NEW YORK, N. Y., A FIRM COMPOSED OF HERMAN NEUWIRTH AND JACOB BERNSTEIN.

HYDROMETER.

Application filed June 30, 1926. Serial No. 119,666.

My invention relates to hydrometers such as are used for testing the specific gravity of the electrolyte in a storage battery. It relates to that type of hydrometer in which the electrolyte is drawn into a glass barrel by means of a suction bulb, and in which barrel there is a float having a suitable scale for indicating, according to the position at which the float rises in the electrolyte, the specific gravity of the latter.

In hydrometers of the syringe type it is necessary to draw some of the electrolyte into the float chamber and it is very often unhandy to secure a reading without removing the hydrometer away from the battery; and such hydrometers have a tendency to drip, with the result that some of the electrolyte often falls on the clothing, or upon carpets, rugs or floors, causing injury to them. The object of my invention is to provide simple means for preventing the electrolyte or acid from dripping from the hydrometer while the reading is being taken. With a hydrometer equipped with the present device, the same may be removed any distance from the battery for the purpose of taking the reading and without fear of any of the acid dripping. If the battery is on the floor or in an inconvenient position, it is only necessary to draw some of the acid into the barrel, sufficient to support the float, and the hydrometer may then be carried to a point where a light may be used to facilitate the reading upon the scale and without fear of the acid dripping on the clothing or any other object. The device for preventing the acid from dripping is more or less automatic in its operation, so that if it is not necessary to handle it, and furthermore it does not interfere with the passage of the acid into and out of the hydrometer casing, except at such times as the valve is to be closed for preventing dripping. For this purpose the valve for closing the stem is adapted to co-operate with the battery in order that it may be opened automatically by co-operation with the battery when the stem is inserted into the latter, and the valve automatically closes as the stem is withdrawn from the battery.

Another object of my invention is to provide a valve of this character which will also form a hood to prevent the spraying of the acid as it is drawn into or forced out of the lower end of the stem. Heretofore the tendency to drip has been partially overcome by making the bore of the stem very small, which necessarily increases the friction of the acid in the stem and reduces the speed of travel of the acid therein, and causes the formation of bubbles in the acid, within the barrel or float chamber. Where the present device is employed, the bore of the stem may be larger than under present practice because the tendency to drip is overcome by a valve, and by employing a stem with a larger bore the acid may be drawn into and forced out of the float chamber more readily and with less tendency to form bubbles in the acid. These and other objects are accomplished in the several forms of the invention hereinafter described in detail.

In the drawings forming part of this application,

Figure 1 is an elevation of a hydrometer syringe embodying my invention in one form, Figure 2 is an elevation of a portion of the same showing the application of the hydrometer to the battery, Figure 3 is a perspective view of the valve employed in the form of the invention shown in Figures 1 and 2, Figure 4 is a sectional view taken on the line 4—4 of Figure 2 with the parts of the battery omitted, Figure 5 is a sectional view taken on the line 5—5 of Figure 4, Figure 6 is an elevation corresponding to Figure 2 but showing a different form of valve, Figure 7 is a sectional view showing the closed position of the valve in the form of the invention illustrated in Figure 6, Figure 8 is a sectional view taken on the line 8—8 of Figure 7, Figure 9 is a view similar to Figure 6 but showing another form of valve which is adapted to co-operate with the plates of the battery instead of the top of the vent spout, Figure 10 is a sectional view showing the valve of this form of the device in closed position, Figure 11 is a sectional view taken on the line 11—11 of Figure 10, Figure 12 is a sectional view of the lower portion of a hydrometer showing my invention in still another form, Figure 13 is a sectional view of the valve and its operating means as used in the form shown in Figure 12, and Figure 14 is a perspective view of the lower end of the stem employed in this form of the invention.

Referring first to the form of my invention illustrated in Figures 1 to 5 inclusive, I have chosen to illustrate a hydrometer comprising a float chamber or barrel 1 within which the acid to be tested is adapted to be drawn by means of the compressible bulb 2 which is attached to one of the open ends of the barrel or float chamber. The latter is usually made of transparent material, preferably glass, in order that the position of the float and the level of the liquid may be observed through the barrel.

While I have shown a common form of cylindrical barrel, it will be obvious that so far as this invention is concerned, any other shape of barrel may be used.

The float 3 which is a hollow body, usually made of glass and hermetically sealed, and generally weighted at the bottom, is provided with a stem 4 on which is marked a suitable scale 5 for indicating the level at which the float is supported by the liquid. This float and its function are the same as in hydrometers now in general use. There is a plug 6, usually of rubber, which is attached to the lower open end of the barrel; and there is a comparatively small stem 7 having one end secured in the bore 8 of this plug, and extending some distance therefrom. The stem is adapted to be inserted through the spout 9 of the storage battery, so that the lower end projects into the electrolyte 10 above the battery plates 11. For this purpose it will be understood that the usual vent cap (not shown) is removed from the spout 9 to permit the stem of the hydrometer to be inserted when making a test.

The stem 7 is provided with a bore 12 extending substantially the full length thereof, and the upper end of this bore is in communication with the interior of the barrel 1. In the form shown in Figures 1 to 5 the lower end of this stem is provided with a flange 13 which forms a stop for a valve which is slidably mounted upon the stem. The lower end of the stem is provided with lateral openings 14 through which the electrolyte passes when being drawn into or forced out of the bore 12 of the stem, these apertures being placed near the bottom end of the stem or near the flange 13 and they form the only inlet and outlet for the acid or electrolyte. The valve 15 consists of a body of material such as hard rubber, guttapercha, or any other suitable material, and it is provided with a bore 16 extending laterally therethrough, so that the valve body may be placed over the upper end of the stem 7 before the latter is inserted into the plug 6, and this valve body is adapted to slide freely upon the stem between the plug and the lower flange 13. In this form of the device, the length of the valve body 15 is greater than the internal diameter of the spout 9 so that when the stem 7 is inserted into the spout to project the lower end below the level of the liquid, the valve will rest on the top of the spout 9 and the stem will slide downwardly through the bore 16, leaving the valve resting on the spout, as shown in Figure 2. When the parts are in this position the lower ports 14 of the stem are open and the acid may be drawn into the barrel by first compressing the bulb 2 to exude the air, and then releasing the bulb to allow it to draw the acid into the barrel by suction in the usual manner, or conversely, in this position, the acid previously drawn into the barrel may be ejected by compressing the bulb. Assuming that the device is being applied to the battery for the purpose of making a test, the steam 7 is inserted through the spout 9 of the battery as shown in Figure 2, the valve being held up in the manner shown. By squeezing and releasing the bulb, the acid will be drawn through the ports 14 thence upwardly through the bore 12 of the stem, and into the barrel containing the float. When sufficient acid has been drawn up to completely sustain the float, the hydrometer may then be lifted off the battery, whereupon the valve 15 will slide down on the stem until it rests against the flange 13 and in this position it will close the ports 14 and prevent the acid from dripping from the stem. In this condition the hydrometer may be carried any desired distance from the battery in order to obtain suitable light for taking the reading on the float, and during this operation no acid will drip from the stem even though the hydrometer is shaken in the operation. After the reading has been taken, the stem of the hydrometer will be again inserted through the spout 9 and the valve 15 will be held up by the spout to keep the ports 14 open while the bulb is being compressed to eject the acid which was previously drawn in for the reading. When the hydrometer is again withdrawn, the valve 15 will slide down upon the stem and close the ports 14 so that if any acid has been inadvertently retained within the hydrometer, it will not drip out. It will be apparent that the valve co-operates with the battery and its operation in closing and opening the outlet ports 14 will be more or less automatic and it requires no attention on the part of the operator any more than with the plain forms of hydrometers now in use. Because of the complete closure of the ports 14 by the valve, it is possible to make the bore 12 of the stem larger, thus facilitating the rapid filling and emptying of the barrel without forming bubbles in the acid within the barrel.

In Figures 6, 7 and 8 I have shown another form of valve, the other parts remaining the same as in the first form. In this form, the valve 17 is also of sufficient diameter to be engaged by and rest upon the top of the spout 9 of the battery when the stem is inserted into the electrolyte. This valve has a bore 18 corresponding with the exterior diameter of the stem, so that the valve may slide easily upon the latter; and in addition, the valve is provided with a bore 19 on its bottom surface, and with a sub-bore adapted to receive therein the lateral flange 13 on the lower end of the stem. When this form of valve is in closed position, as shown in Figure 7, there is a double sealing action formed by the fitting of the valve around the ports 14 and by the flange 13 fitting within the subbore 20 and this more perfectly prevents the dripping of the acid when the valve is in closed position. This form of valve also closes the upper end of the spout 9 while the acid is being drawn in or exuded from the barrel, so that if there is any tendency of the acid to spray at the ports 14, the acid cannot splash out of the battery because of the sealing action of the valve 17 on the top of the spout. In other respects the valve 17 serves the same purpose as the valve 15 in the first form.

In the form shown in Figures 9 to 11 inclusive, the hydrometer is the same as in the previous forms, but the valve is somewhat modified. In this form the valve 21 is also adapted to slide freely upon the exterior of the stem 7 but its external diameter is such as to permit the valve to enter the spout 9 of the battery, and to rest upon the top of the battery plates 11 as shown in Figure 9. This type of valve is also shown provided with a bore 22 on its bottom surface and with a sub-bore 23 adapted to receive the flange 13 of the stem. When the stem is inserted through the spout 9 until the stem rests upon the top of the battery plates, the valve will be held up to the position shown in Figure 9, and the acid will rise within the valve to the ports 14 so that the barrel may be filled or emptied while the valve is in this position. When the hydrometer is lifted from the battery, the stem 7 will slide upwardly within the valve until the flange 13 seats within the sub-bore 23 at which time the ports 14 will be closed by the valve as shown in Figure 10, and from them the valve will be raised with the stem and it will serve the purpose of closing the ports 14 in the same manner as in the previously described forms. In this type of valve the acid is also prevented from splashing while the barrel is being filled and emptied.

In Figures 12 to 14 I have shown a stem 24 which is provided with a bore 25 extending entirely therethrough, and the lower end of the stem is slotted as shown at 26 in order to permit the liquid to enter from the slides. There is a valve 27 within the barrel and it is adapted to seat upon the upper end of the stem for the purpose of closing the bore 25. There is a small wire 28 attached at one end to the valve 27 and it extends through the bore 25 and at its lower end it is attached to an operating member 29 which is adapted to co-operate with the battery plates 11 for the purpose of lifting the wire 28 and thereby raising the valve 27 away from the top of the stem. When the stem is inserted into the battery the operating member 29 will come to rest on the top of the battery plates and the stem will move down until it rests on this operating member, and this will cause the wire 28 to rise in relation to the stem and lift the valve 27 from the top thereof. In this position of the parts as shown in Figure 12, the acid may be drawn into and ejected from the barrel. The operating member 29, though the stem rests upon it, does not close the lower end of the stem, because of the slot 26. After the acid has been drawn into the barrel, the hydrometer may be lifted from the battery, whereupon the valve 27, the wire 28, and the operating member 29 will fall by gravity a slight extent, so that the valve will seat upon the upper end of the stem and thereby serve to prevent the acid from dripping from the barrel while the reading is being taken.

From the above it will be apparent that I have provided simple and efficient means, automatic in its operation, for closing the hydrometer to prevent dripping while the reading is being taken.

Having described my invention, what I claim is:

1. A hydrometer of the class described comprising a barrel and means for drawing liquid thereinto, a stem attached to one end of the barrel adapted to be inserted into the electrolyte of a battery, a valve for shutting off the flow of liquid from said barrel and means co-operating with the battery and adapted to be operated thereby upon the insertion of said stem into the electrolyte and adapted to effect the opening of said valve.

2. A hydrometer of the class described including a barrel and means for drawing liquid thereinto, a stem attached to one end of the barrel and adapted to be inserted into the electrolyte of a battery, said stem having a longitudinal bore communicating with the interior of said barrel and having an outlet port communicating with said bore, and a movable valve co-operating with said port and adapted to co-act with the battery whereby the act of inserting said stem into the battery will effect the opening of said valve and withdrawal of the stem from the battery will effect the closing of said valve.

3. A hydrometer of the class described including a barrel and means for drawing liquid thereinto, a stem attached to one end of the barrel and adapted to be inserted into the electrolyte in a battery, said stem having a longitudinal bore communicating with the interior of the barrel and having an outlet port communicating with said bore, and a valve slidably engaging over said stem for opening and closing said port.

4. A hydrometer of the class described including a barrel and means for drawing liquid thereinto, a stem attached to one end of the barrel and adapted to be inserted into the electrolyte in a battery, said stem having a longitudinal bore communicating with the interior of the barrel and having an outlet port communicating with said bore, and a valve slidably engaging over said stem for opening and closing said port, said valve being adapted to co-operate with the battery whereby when the stem is inserted therein the valve is moved automatically to opened position and to closed position when the stem is removed from the battery.

5. A hydrometer of the class described comprising a barrel and means for drawing liquid thereinto a stem attached to one end of the barrel and adapted to be inserted into the electrolyte in a battery, said stem having a longitudinal bore communicating with the interior of said barrel and having an outlet port communicating with said bore, said stem having a flange on its lower end and a valve sliding on said stem and adapted, when resting on said flange, to close said port.

6. A hydrometer of the class described comprising a barrel and means for drawing liquid thereinto, a stem attached to one end of the barrel and adapted to be inserted into the electrolyte in a battery, said stem having a longitudinal bore communicating with the interior of said barrel and having an outlet port communicating with said bore, said stem having a flange on its lower end and a valve sliding on said stem and adapted, when resting on said flange, to close said port, said valve being arranged to engage a portion of the battery and to be held in open position when the stem is inserted into the electrolyte and to move into closed position when the stem is removed therefrom.

7. A hydrometer of the class described comprising a barrel and means for drawing liquid thereinto, a stem attached to one end of the barrel and adapted to be inserted into the electrolyte in a battery, said stem having a longitudinal bore communicating with said barrel, and having an outlet port communicating with said bore, a valve slidable over said stem for opening and closing said port, said valve having a lateral extension forming a cap adapted to close a spout of the battery when said stem is inserted into the battery.

8. A hydrometer of the class described comprising a barrel and means for drawing liquid thereinto, a stem attached to one end of the barrel and adapted to be inserted into the electrolyte in a battery, said stem having a longitudinal bore communicating with the interior of the barrel and having an inlet and outlet port communicating with said bore, a valve slidable on said stem, and having a recessed bottom for deflecting liquid ejected from said port, said valve co-operating with the battery, whereby it is held in open position when the stem is inserted into the battery.

9. A hydrometer of the class described comprising a barrel and means for drawing liquid thereinto, a stem attached to one end of the barrel and adapted to be inserted into the electrolyte in a battery, said stem having a longitudinal bore communicating with the barrel and having an inlet and outlet port, a flange on the lower end of said stem, and a valve sliding on said stem and adapted to close said port, and having a recess to receive therein the flange on the lower end of said stem.

Signed at the city, county and State of New York, this 18th day of May, 1926.

HERMAN NEUWIRTH.